March 30, 1943.  A. R. HAVENER  2,315,258
RADIAL FASTENER SETTING MACHINE
Filed June 2, 1939   6 Sheets-Sheet 1

Patented Mar. 30, 1943

2,315,258

UNITED STATES PATENT OFFICE 2,315,258

RADIAL FASTENER SETTING MACHINE

Arthur R. Havener, Wayland, Mass., assignor to Judson L. Thompson Manufacturing Company, Waltham, Mass., a corporation of Massachusetts Application June 2, 1939, Serial No. 277,036

9 Claims. (Cl. 78—49)

This invention relates to fastener setting machines and has for an object to provide a machine for setting at a single operation a plurality of fasteners, the axes of which converge, being substantially radial to a common center. Thus a plurality of fasteners may be set simultaneously in curved work without tending to distort the work from its curved contour, or setting the fasteners improperly, as might occur with the fasteners set with the axes of the setting devices parallel to each other.

A further object is to provide an improved actuating mechanism for a plurality of sets.

Another object is to provide for simple adjustment of the setting parts of the radial machine such that the spacing of the fasteners in the work may be varied to a considerable degree to suit the requirements of any particular work.

For a more complete understanding of this invention, together with further objects and advantages, reference may be had to the accompanying drawings showing by way of example, but not of limitation, rivet setting machines embodying the invention.

Figures 1, 2:
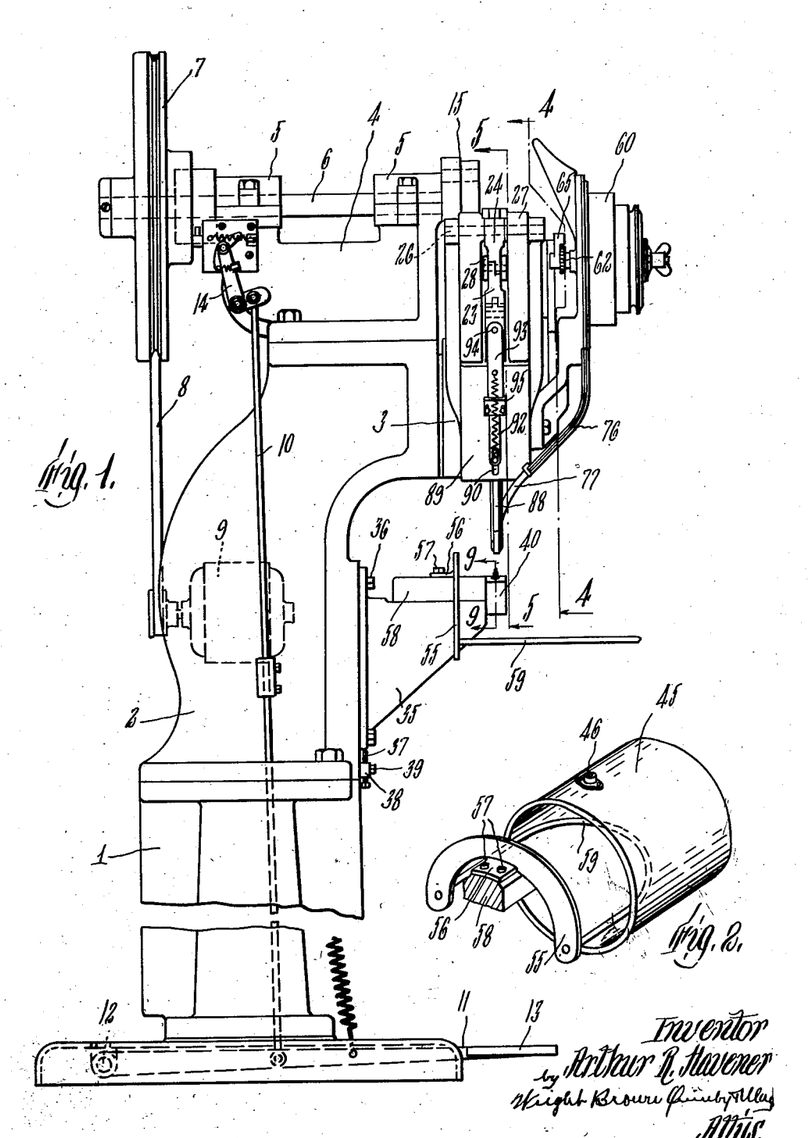
Figure 1 is a side elevation of a riveting machine of one type.
Figure 2 is a perspective view of the work support showing an article partly in position thereon and on which the machine shown in Figure 1 is adapted to operate.

Referring first to the machine illustrated in Figures 1 to 10, inclusive, the machine comprises a suitable stand 1, to the upper end of which is secured a bracket 2. To the forward face of the upper portion of the bracket 2 is secured a support 3 for the rivet-driving mechanism, and a bracket 4 secured to the top of the bracket 2 supports bearings 5 for a drive shaft 6 for actuating the setting mechanism. The support 3 may be secured to the brackets 2 and 4 as by screws 3a. As shown in Figure 1, the shaft 6 extends to the rear of the machine where it carries a belt pulley 7 driven by the belt 8 from a driving motor 9 carried by the bracket 2. This drive wheel 7 may be clutched to or unclutched from the shaft 6 by any suitable means, a portion of the controlling mechanism for a one-revolution clutch being shown at 14. This mechanism may be actuated through a pull rod 10 by a treadle 11 fulcrumed at 12 on the base of the machine stand, and having a foot portion 13, by the depression of which the machine may be started for a single revolution in the well understood manner.

At the forward end of the shaft 6 it carries a crank arm 15 to which is pivoted the upper end of a link 16, the lower end of which link is pivoted as at 17 to the upper end of a central slide 18. This central slide is mounted in a central vertical guideway 19 in the support 3 and on either side of this central guideway is a guideway 20 in which are reciprocable side slides 21. A cover plate 3b secured by the screws 3a retains the slides in their respective guideways. The axes of these side slides 21 converge downwardly toward the axis of the central slide 19. At the upper end of each side slide 21 there is pivotally connected thereto, as at 22, the lower of a pair of toggle links 23 and 24, which are hinged together as on the pivot 25. The upper end of each link 24 is fulcrumed on the pivot pin 26 to an upward extension 27 from the support 3 and in substantial alinement with the axis of its respective side slide. A pair of links 28 are employed to connect the hinge axes 25 of the pairs of toggle links 23 and 24 to laterally extending ears 29 at the upper end of the central slide 18.

Figure 5:
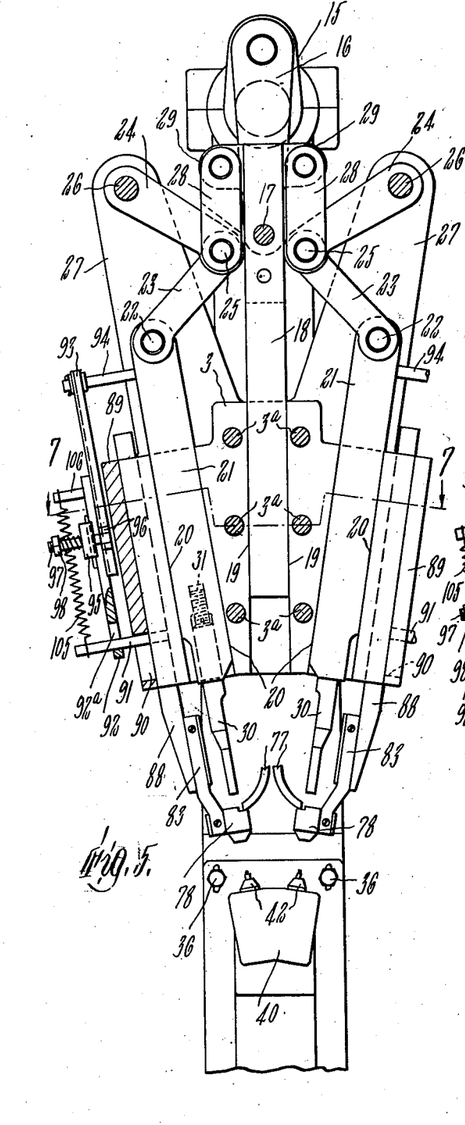
Figure 6:
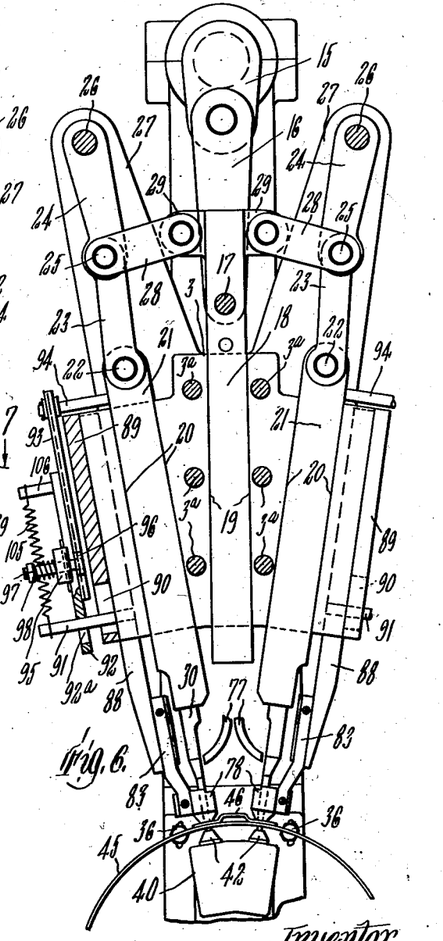
Figure 6 is a view similar to Figure 5, but showing the mechanism in rivet setting position.

It will thus be seen that as the shaft 6 is rotated from the position shown in Figure 5 where the crank arm 15 extends upwardly, to the position shown in Figure 6 where the crank arm extends downwardly, the toggle links 23 and 24 are moved from the broken position of Figure 5 to the made position of Figure 6, the center slide 18 being moved downwardly and the side slides 21 also moved downwardly and toward the axis of the center slide. The side slides 21 have secured at their lower ends the rivet drivers 30 and it will be noted that because of the toggle link construction, the final portion of the downward movement of each of the slides 21 is accomplished with mechanical advantage, the velocity of motion being slowed, while the pressure applied is much increased. This is the driving motion of the rivet drivers 30 during which the rivets are set in the work.

On the forward face of the bracket 2 is secured an anvil bracket 35, this securement comprising the screw and slot connections at 36 which permits the height of this bracket 35 to be adjusted. To facilitate such adjustment the lower edge of the bracket 35 adjacent to the bracket 2 may rest upon the upper end of one or more adjusting screws 37, each threaded through a boss 38 on the forward face of the bracket 2 and adapted to be fixed in adjusted position as by a set screw 39.

The forward end of the bracket 35 is formed as an anvil block 40. As shown best in Figures 9 and 10, this anvil block 40 is provided with a pair of sockets 41 converging toward each other downwardly, these sockets being adapted to adjustably receive therein in a rigid manner the anvils 42, these being arranged at an angle to the vertical corresponding to the angular relationship between the side slides 21. For the purpose of such positive adjustments the anvils are shown as backed up by threaded plugs 43 engaging threaded lower portions of the sockets 41. By effecting such adjustment in line with the axes of the respective anvils, it is evident that the spacing between the upper ends of the anvils may be adjusted, since the further up these anvils are positioned, the wider is the spacing, and the lower they are positioned, the closer together they come. To compensate for this adjustment the drivers 30 may also be adjustably secured in the slides 21 in any suitable manner as by the use of abutment screws 31 (Figure 5) threaded into the bases of the sockets in the slides 21 which take the drivers.

Figures 7, 8, 9, 10:
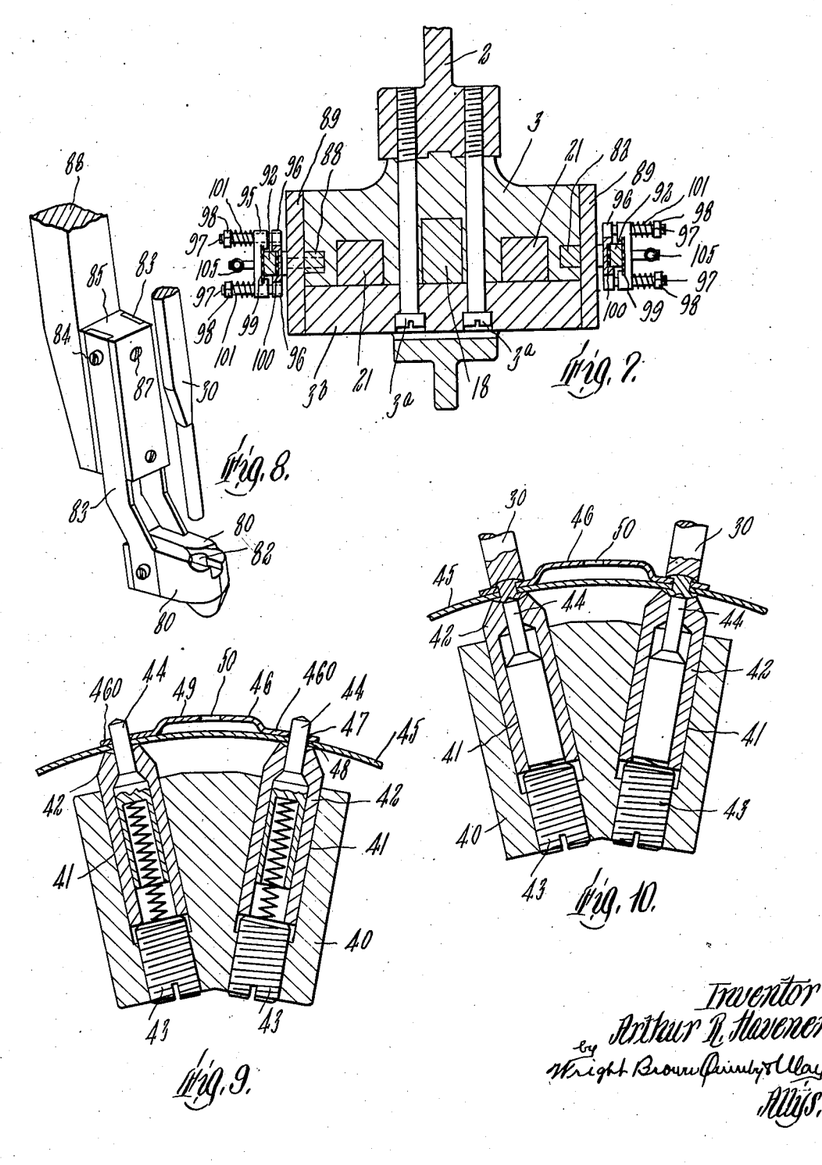
Figure 7 is a detail section on line 7—7 of Figure 5.
Figure 8 is a fragmentary perspective view showing a rivet holder and showing the setting tool retracted.
Figure 9 is a detail vertical section on line 9—9 of Figure 1.
Figure 10 is a view similar to Figure 9, but showing the rivets just set in the work.

Each of the anvils 42 carries a spring pressed pilot 44 yieldable to permit the setting operation, as shown in Figure 10, but normally projecting above the top face of the respective anvil and serving to support the work in proper relation for the rivets to be set therethrough. For example, as shown in Figures 2, 6, 9 and 10, the work may comprise a pail having a curved side wall 45 and an ear 46 to receive a handle. As shown this ear 46 has its end portions 46a shaped to overlie the outer face of the side wall 45. Rivets are set by the machine through mating holes 47 and 48 in these parts. The central portion 49 of the ear is laterally offset from the outer face of the wall 45 and provided with an opening 50 through which may be sprung the wire handle (not shown) with which such pails are commonly provided.

For the purpose of proper positioning of the work relative to the rivet-setting mechanism, the bracket 35 may have secured thereto an arcuate back gage plate 55 which may be provided with an ear 56 for securement as by screws 57 to a rear extension 58 of the anvil block 40. The lower end portions of the gage plate 55 may have secured thereto a loop member 59, so that the work may be readily engaged over the outer end of this member and then moved backwardly against the gage plate 55 to proper position for the riveting operation with the holes 47 and 48 in the pail and bail ear located by the pilots 44 which extend therethrough and with the work supported by the anvils.

Figures 3, 4:
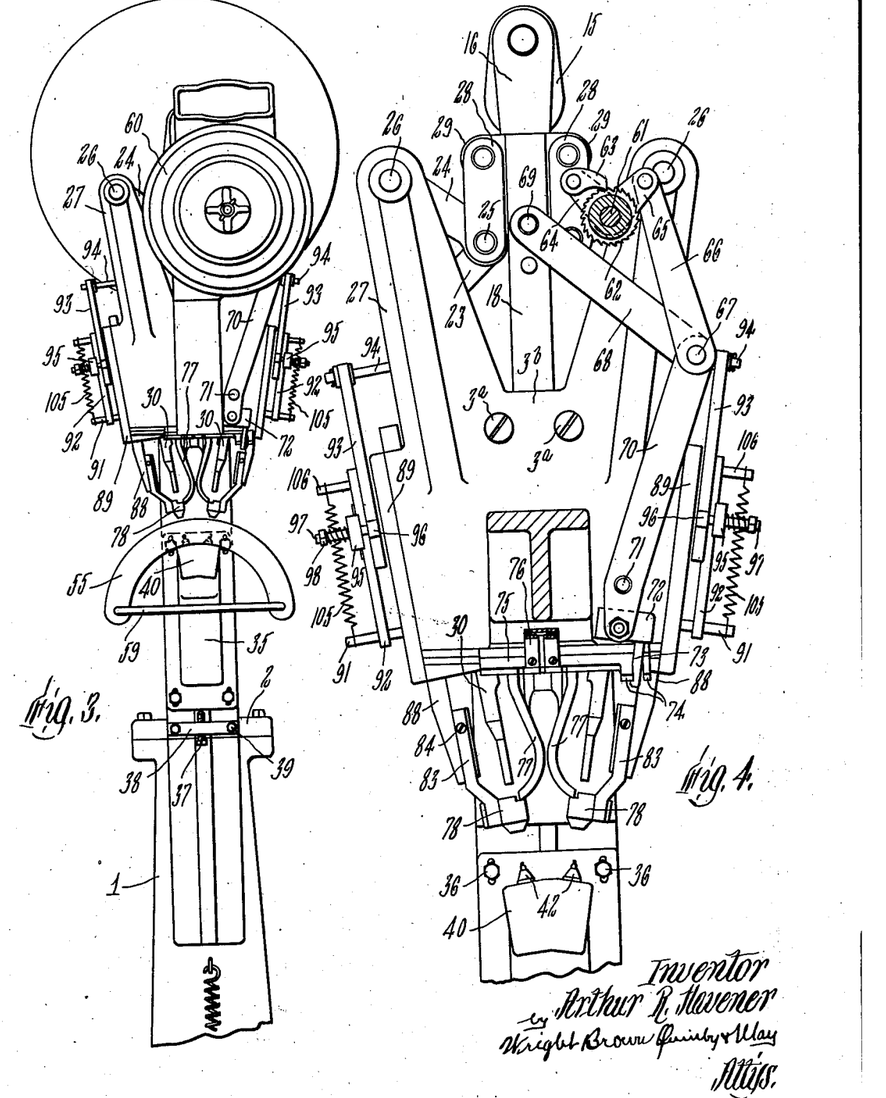
Figure 3 is a partial front elevation of the machine of Figure 1.
Figures 4 and 5 are detail sections on the correspondingly numbered section lines of Figure 1.

Rivets may be supplied to both of the setting mechanisms from a single supply hopper 60 which may be provided with a rotary rivet-agitating mechanism of any suitable or usual type driven by the rotation of a shaft 61 (see Figure 4). This shaft 61 may be intermittently rotated as the machine is operated, and for this purpose the shaft 61 is shown as provided with a ratchet wheel 62 with which engages a pawl 63 pivoted to the outer end of an arm 64 journaled on the shaft 61. This arm also has secured thereto a second arm 65 to which is pivoted the upper end of a link 66. The lower end of the link 66 is connected by a pivot 67 to the lower end of a link 68 pivoted at 69 to the slide 18 and the pivot 67 also pivots the upper end of a lever 70. This lever 70 is fulcrumed at 71 at a fixed point and its lower end carries a block 72 provided with a downwardly extending pin 73. This pin 73 engages between the forks 74 of a rivet separator and divider 75 mounted for sliding motion, in such a manner as to transfer rivets descending from the hopper 60 through the main raceway 76 from this raceway into supplemental raceways 77, alternately, on opposite directions of motion of the member 75. These supplemental raceways lead the rivets to rivet holders 78.

As shown in Figure 8, each rivet holder may comprise a pair of jaws 80, together defining a rivet-receiving opening 82 between them, these jaws being carried by arms 83 secured at their upper ends as at 84 in a carrier block 85. These arms 83 may be permitted to yield at their lower ends from each other by the pressure of the lower end of the driver 30 thereagainst, so as to permit the rivets to be driven down between the jaws and set in the work. Any suitable means for providing for yielding of these jaws away from each other to permit this action may be employed, various constructions for permitting this being old and well known in the art and forming no part of the present invention.

As shown best in Figures 2, 5, 6 and 7, each of the blocks 85 is secured as by screws 87 to slides 88. These slides are mounted in ways in the outer edge faces of the support 3 and are retained in position as by cover plates 89 and they are connected for reciprocation for a portion only of the reciprocation of the setting slides 21, the slides 88 being driven in such a manner that they follow the motion of the slide 20 during an intermediate portion only of the motion of such slides 21 and between an upper limit of motion in which the drivers 30 are raised thereabove to an extent sufficient to permit the feed of a rivet between the jaws, and a lower limit retained a suitable distance above but close to the work while the drivers continue their motion and set the rivets in the work. The limits of motion of each of the slides is determined by the length of a slot 90 in each of the cover plates 89 and through which extends a pin 91 anchored in the slide 88 at its inner end. The pin 91 extends through a slot 92a in a friction slide 92 which overlaps an actuating slide 93 fixed at its upper end to a pin 94 carried by the adjacent driver slide 21. These slides are held in frictional engagement with each other as by a clamping shoe 95 secured to lateral extensions 96 from the slide 93 by screws 97 and nuts 98, these screws passing on either side of the slide 92. Friction plates 99 and 100 are interposed between the slide 92, the clamp 95 and the slide 93, and are pressed between these parts by springs 101 surrounding the bolts 97 (see Figure 7). Springs 105 reacting between the pins 91, and pins 106 projecting from the upper portions of the slides 92, tend to retain the tops of the slots 92a in engagement with the pins 91, and the rivet holders themselves at their upper limits when the drivers are retracted as in Figure 5. During the first portion of the downward stroke of the slides 21, the slides 92 and 93 move together without lowering the rivet holders, during which time the drivers enter the holders toward or into contact with the rivets therein. After the top of the slots 92a contact the pins 91, the holders descend with the drivers until the pins 91 strike the lower ends of the slots 90 after which the drivers descend alone, the slides 92 and 93 slipping, and set the rivets.

In operation of the machine, the work is first positioned on the work support and pushed back against the gage plate 55 and with the pilots 44 extending through the holes in the pail and the ear to receive the rivets. Then by depressing the treadle the machine is driven through a complete cycle of operations, including a down stroke of the central slide which results in a down stroke of the rivet drivers as hereinbefore recited which force the rivets through the rivet holders and down into the holes through which the pilots 44 are projected, riveting the ear to the pail by a pair of rivets substantially simultaneously and arranged with their axes converging toward the central axis of the pail. The rivet drivers and holders then retract to their upper positions, leaving the rivet holders stationary after they have been lifted to the desired extent so that other rivets can be fed into position as they are taken from the main raceway 76 and distributed alternately to the supplemental raceways 77, and the machine stops.

The friction drive mechanism for the rivet holders is not claimed herein, since it forms subject matter of a co-pending application Serial No. 269,926 filed April 25, 1939.

In Figures 11 to 15 another form of machine is shown for driving a pair of rivets simultaneously in radial relations. In this machine there is a central slide 110 guided for vertical motion in an upper bearing 111 of a bearing bracket 112 having a lower bearing 113 in axial alinement with the upper bearing. The slide 110 has mounted thereon a collar 110a provided with oppositely disposed extensions 110b to the outer ends of which are pivoted links 114, the lower ends of which are pivoted as at 115 to the upper ends of driver slide bars 116. Beneath the collar 110a the slide 110 has pivoted thereto forks 117 at the forward end of a rocker arm 118. This rocker arm is supported by a pair of links 119 pivoted thereto on the fulcrum 120 from a fulcrum shaft 121 carried by the machine head 122. The rear end of the arm 118 has pivoted between forks 123, the upper end of a bar 124 which is adjustably secured to a bearing block 125 pivoted on a crank pin 126 between opposite crank arms 127 of a drive shaft 128. The adjustment between bar 124 and block 125, adjusts the stroke of the rivet set.

Figure 11:
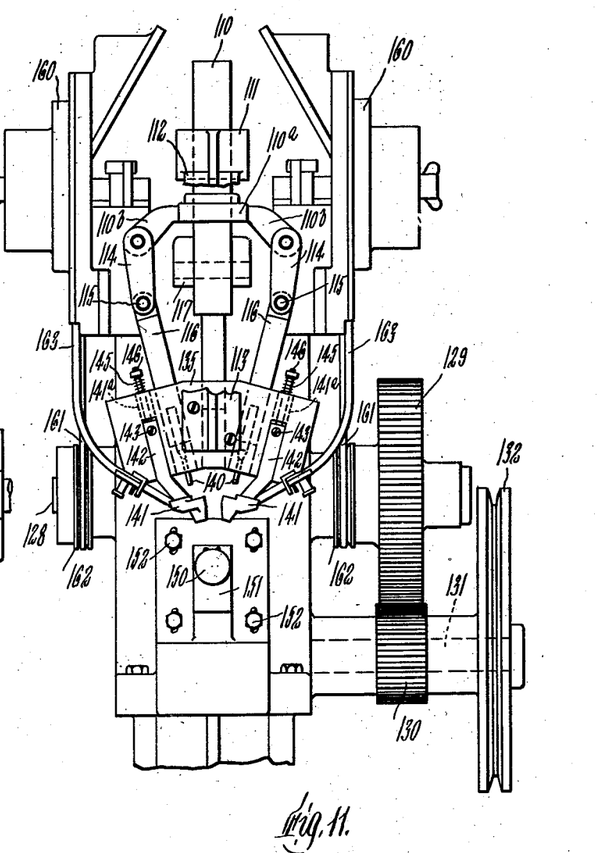
Figure 11 is a fragmentary front elevation of a setting machine of a different construction.
Figure 12:
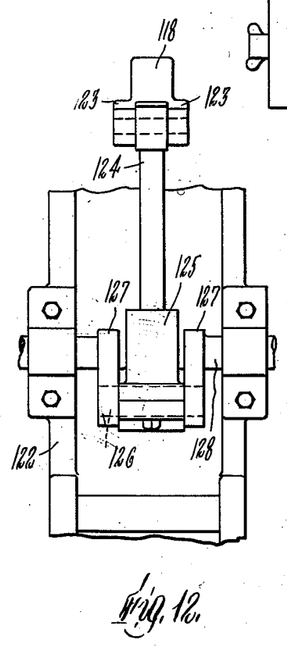
Figure 12 is a fragmentary rear elevation of a portion of the set-actuating mechanism for the machine of Figure 1.

As shown in Figure 11, this drive shaft 128 has a gear 129 fixed thereto meshing with a pinion 130 on a main drive shaft 131. This drive shaft may be provided with a drive pulley 132 by which it may be rotated. The driver slides 116 are mounted for reciprocatory motion in the support 135, guiding the slides 116 in a substantially radial direction to an axis which is intersected by the axis of the central slide 110. The lower ends of these driver slides 116 carry the rivet drivers 140 which are arranged to pass through between the spaced jaws of rivet holders 141 carried by arms 142 secured at their upper ends at 143 to slides 141a carried by the support 135. The slides 141a are urged to upper positions as by springs 145 surrounding studs 146 threaded in the upper ends of these slides and reacting between nuts on these studs and the top of the support 135. Impingement of the drivers 140 on rivets in the holders lowers the holders to the work, the drivers then further descending to force the rivets through the holders and set the rivets in the work.

Figures 13, 15:
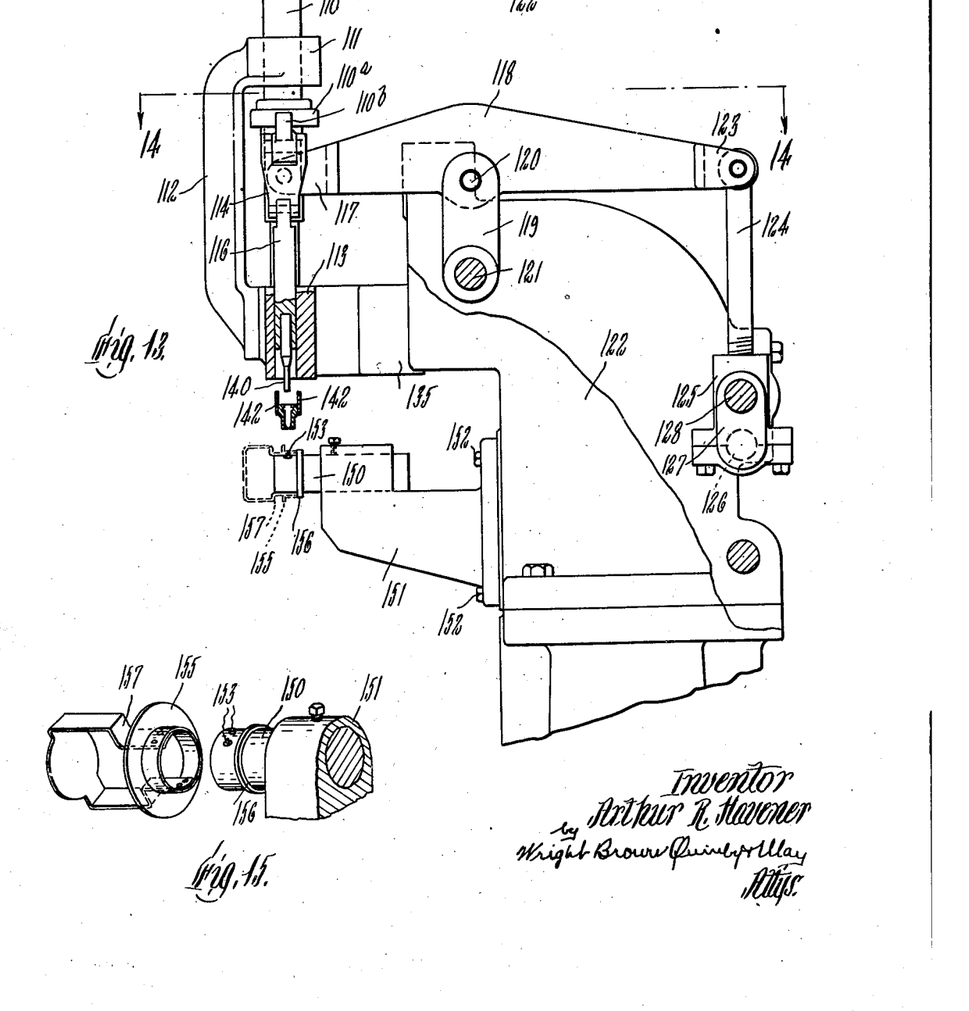
Figure 13 is a view partly in side elevation and partly broken away or in section of the machine of Figure 11.
Figure 15 is a fragmentary perspective view showing the work support and a work piece to be riveted while carried on said support, adjacent thereto.
Figure 14:
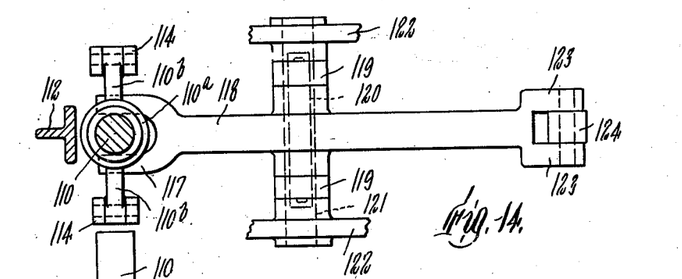
Figure 14 is a detail section on line 14—14 of Figure 13.

As shown best in Figure 15, anvil block 150 intended for supporting work of relatively small diameters is in the form of a shaft which may be fixed in adjusted position both angularly and axially in a bracket 151 secured to the forward face of the head 122 as by means of bolts 152. These bolts may, if desired, pass through slots in the bracket 121 so as to permit vertical adjustment of this bracket. The anvil block 150 is provided with a pair of anvil members 153 arranged substantially radial to an axis and in position to pass through the holes in the work to be riveted. As shown this work comprises a flanged collar 155 which may be placed over the anvil block and back against a back gage ring 156 thereon, and side members 157, the ends of which are to be riveted to the hub portion of the collar 155. It should be evident, however, that other types of work which are adapted to be placed on the anvil block might be employed if desired.

In this machine a pair of hoppers for rivets are shown at 160 and their agitating mechanism may be driven continuously as through the belts 161 passing around drive pulleys 162 carried by the shaft 128. Each of these hoppers is provided with its own raceway 153 which extends down to its respective rivet holder 141 with which it cooperates in the manner well known in the art.

This machine may be provided with a one-revolution clutch of any suitable description so that a single cycle of the machine will start with the drivers 116 in elevated position, force them down to clinch the rivets in the work, and then retract them, the machine stopping in the full retracted position.

From the foregoing description of certain embodiments of this invention, it should be evident to those skilled in the art that various other changes and modifications might be made without departing from the spirit or scope of this invention as defined by the appended claims.

I claim:

1. A rivet setting machine having a pair of setting anvils arranged to support the work and with their axes converging, rivet-driving mechanism associated with each of said anvils and with its axis alined with the axis of its respective anvil, and means for positively adjusting said anvils in line with said axes.

2. A rivet setting machine having a pair of setting anvils arranged with their axes converging, rivet-driving mechanism associated with each of said anvils and with its axis alined with the axis of its respective anvil, means for adjusting said anvils as a unit toward and from said devices in a direction intermediate to said axes, and means for adjusting said anvils axially.

3. A rivet setting machine having a pair of setting anvils arranged to support the work and with their axes converging, rivet-driving mechanism associated with each of said anvils and with its axis alined with the axis of its respective anvil, a bracket having sockets coaxial with said anvils, and means for positively adjusting said anvils in said sockets in line with their respective axes.

4. A rivet setting machine having a pair of setting anvils arranged with their axes converging, rivet-driving mechanism associated with each of said anvils and with its axis alined with the axis of its respective anvil, a bracket having sockets coaxial with said anvils, means for adjusting said anxils axially in said sockets, and means for adjusting said bracket in a direction intermediates to said axes.

5. A rivet setting machine having a pair of setting anvils arranged with their axes converging, rivet driving mechanism including a driver associated with each of said anvils and with its driver alined with the axis of its respective anvil, means for adjusting each anvil axially to thereby adjust the spacing at the upper ends thereof, and means for adjusting the drivers axially in accordance with the adjustment of such anvils.

6. In a machine of the class described, a frame having central and side guideways therein, the axes of said side guideways converging toward the axis of said central guideway, slides in said guideways, fastener drivers carried by said side slides, operative connections between said side slides and said center slide, means for reciprocating said center slide, anvils for cooperation with said drivers and arranged substantially in the axes of said drivers, means for adjusting said anvils in line with said axes, and means for adjusting the driving limit of said drivers.

7. In a machine of the class described, a frame having central and side guideways therein, the axes of said side guideways converging toward the axis of said central guideway, slides in said guideways, fastener drivers carried by said side slides, operative connections between said side slides and said center slide, means for reciprocating said center slide, anvils for cooperation with said drivers and arranged substantially in the axes of said drivers, means for adjusting said anvils in line with said axes and in line with the axis of said central guideway, and means for adjusting the driving limit of said drivers.

8. In a machine of the class described, central and side slides, rivet sets carried by said side slides, a rivet holder for each set, driving connections from said center to said side slides, a rivet supply hopper having a rotary actuating means, a main raceway leading from said hopper, a supplemental raceway for each holder, a member movable to transfer rivets from said main raceway alternately to said supplemental raceways, operative connections from said central slide to said actuating means and to said member, and means for reciprocating said central slide.

9. In a machine of the class described, central and side slides, rivet sets carried by said side slides, a rivet holder for each set, driving connections from said center to said side slides, a rivet supply hopper having a rotary actuating means, a main raceway leading from said hopper, a supplemental raceway for each holder, a member movable to transfer rivets from said main raceway alternately to said supplemental raceways, a lever having one arm operatively connected to said member, a link pivotally connecting the other end of said lever to said central slide, an arm pivoted on said rotary actuating means, a link connecting said arm to said other end, and a ratchet drive from said arm to said rotary actuating means.

ARTHUR R. HAVENER.

CERTIFICATE OF CORRECTION.

Patent No. 2,315,258.    March 30, 1943.

ARTHUR R. HAVENER.

It is hereby certified that the name of the assignee in the above numbered patent was erroneously described and specified as "Judson L. Thompson Manufacturing Company" whereas said name should have been described and specified as --Judson L. Thomson Manufacturing Company--, as shown by the record of assignments in this office; and that the said Letters Patent should be read with this correction therein that the same may conform to the record of the case in the Patent Office.

Signed and sealed this 11th day of May, A. D. 1943.

Henry Van Arsdale,
Acting Commissioner of Patents.

(Seal)